US012674873B2

(12) United States Patent
Okushiro et al.

(10) Patent No.: US 12,674,873 B2
(45) Date of Patent: Jul. 7, 2026

(54) OBJECT RECOGNITION DEVICE, OBJECT RECOGNITION METHOD, AND NON-TRANSITORY PROGRAM RECORDING MEDIUM

(71) Applicant: JVCKENWOOD Corporation, Yokohama (JP)

(72) Inventors: Hidetaka Okushiro, Yokohama (JP); Tatsuki Ishikawa, Yokohama (JP); Kumi Nakada, Yokohama (JP); Chisato Suzuki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 595 days.

(21) Appl. No.: 18/336,072

(22) Filed: Jun. 16, 2023

(65) Prior Publication Data

US 2023/0333224 A1      Oct. 19, 2023

Related U.S. Application Data

(63) Continuation of application No. PCT/JP2022/022870, filed on Jun. 7, 2022.

(30) Foreign Application Priority Data

Sep. 24, 2021      (JP) ................................. 2021-155184

(51) Int. Cl.
    *G01S 7/48*     (2006.01)
    *G01S 7/487*     (2006.01)
    *G01S 17/08*     (2006.01)
(52) U.S. Cl.
    CPC .............. *G01S 7/487* (2013.01); *G01S 17/08* (2013.01)

(58) Field of Classification Search
    USPC ........................................................ 356/5.01
    See application file for complete search history.

(56) References Cited

U.S. PATENT DOCUMENTS

| | | | |
|---|---|---|---|
| 12,159,449 B2 * | 12/2024 | Okushiro | ............. G06V 10/764 |
| 2021/0208261 A1 * | 7/2021 | Zhou | ...................... G01S 17/894 |
| 2022/0157050 A1 * | 5/2022 | Okushiro | .................. G06T 5/50 |

FOREIGN PATENT DOCUMENTS

| | | | | |
|---|---|---|---|---|
| CN | 113920255 B | * | 2/2022 | ............. G01C 11/00 |
| CN | 114578341 A | * | 6/2022 | ......... G06F 18/2321 |
| CN | 115773760 A | * | 3/2023 | |
| JP | 2015005143 A | * | 1/2015 | |
| JP | 2019153188 A | | 9/2019 | |
| JP | 2022087822 A | * | 6/2022 | ......... G06F 18/2321 |
| WO | WO-2020215368 A1 | * | 10/2020 | ........... G01S 17/894 |

OTHER PUBLICATIONS

International Search Report from International Application No. PCT/JP2022/022870 mailed Aug. 9, 2022, 4 pages.

* cited by examiner

*Primary Examiner* — James R Hulka
(74) *Attorney, Agent, or Firm* — Shih IP Law Group, PLLC

(57) ABSTRACT

An object recognition device includes: a point cloud measurement unit configured to measure the positions of point clouds included in an object and the distance to each of the point clouds; a noise adding unit configured to add a noise around the measured point clouds according to the distance to each of the point clouds; a noise count memory unit configured to store the total number and position of noises added by the noise adding unit; and a recognition unit configured to recognize the object based on the point clouds and the noises added to the point clouds.

8 Claims, 8 Drawing Sheets

OBJECT

OBJECT RECOGNITION DEVICE, OBJECT RECOGNITION METHOD, AND NON-TRANSITORY PROGRAM RECORDING MEDIUM

CROSS REFERENCE TO RELATED APPLICATION

This application is a continuation of application No. PCT/JP2022/22870, filed on Jun. 7, 2022, and claims the benefit of priority from the prior Japanese Patent Application No. 2021-155184, filed on Sep. 24, 2021, the entire content of which is incorporated herein by reference.

BACKGROUND OF THE INVENTION

1. Field of the Disclosure

The present invention relates to an object recognition device, an object recognition method, and an object recognition program.

2. Description of the Related Art

Patent Literature 1 discloses an object recognition device that adds a predetermined noise to multiple distance measurement points measured by a distance measurement device, forms a cluster representing an object based on the distance measurement points to which the noise has been added, and recognizes the object based on a feature value of the formed cluster.

Patent Literature 1

Japanese Patent Application Publication No. 2019-153188

For example, in the technology disclosed in Patent Literature 1, a noise is added to multiple distance measurement points (hereinafter referred to as a "point cloud") measured by a distance measurement device such as Light Detection and Ranging (LiDAR). By adding a noise, a feature value is added to an object, which causes a stochastic resonance phenomenon and thus improves the recognition rate of the object. The recognition rate can be further improved by changing the number and range of noises added according to the distance to the object. In this case, however, if multiple noises are simply added, a noise added later overwrites the noise data that has already been added, and the feature value added to the object may be lost.

SUMMARY OF THE INVENTION

An object recognition device according to one embodiment of the present invention is to an object recognition device for recognizing an object, including: a point cloud measurement unit configured to measure the positions of point clouds included in the object and the distance to each of the point clouds; a noise adding unit configured to add a noise around the measured point clouds according to the distance to each of the point clouds; a noise count memory unit configured to store the number of noises added by the noise adding unit for each position of the added noises; and a recognition unit configured to recognize the object based on the point clouds and the noises added to the point clouds.

Another embodiment of the present invention relates to an object recognition method. This method is an object recognition method for recognizing an object, including: measuring the positions of point clouds included in the object and the distance to each of the point clouds; adding a noise around the measured point clouds according to the distance to each of the point clouds; storing the number of added noises for each position of the added noises; and recognizing the object based on the point clouds and the noises added to the point clouds.

Still another embodiment of the present invention relates to a non-transitory program recording medium comprising an object recognition program. This program relates to an object recognition method for recognizing an object, including computer-implemented modules including: a point cloud measurement module that measures the positions of point clouds included in an object and the distance to each of the point clouds; a noise adding module that adds a noise around the measured point clouds according to the distance to each of the point clouds; a noise count memory module that stores the number of added noises for each position of the added noises; and a recognition module that recognizes the object based on the point clouds and the noises added to the point clouds.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 2 are diagrams showing examples of noises added by a noise adding unit around point clouds measured by a point cloud measurement unit, where

FIG. 7 show the number of noises stored in the noise count memory unit, where

DETAILED DESCRIPTION

Figure 1:
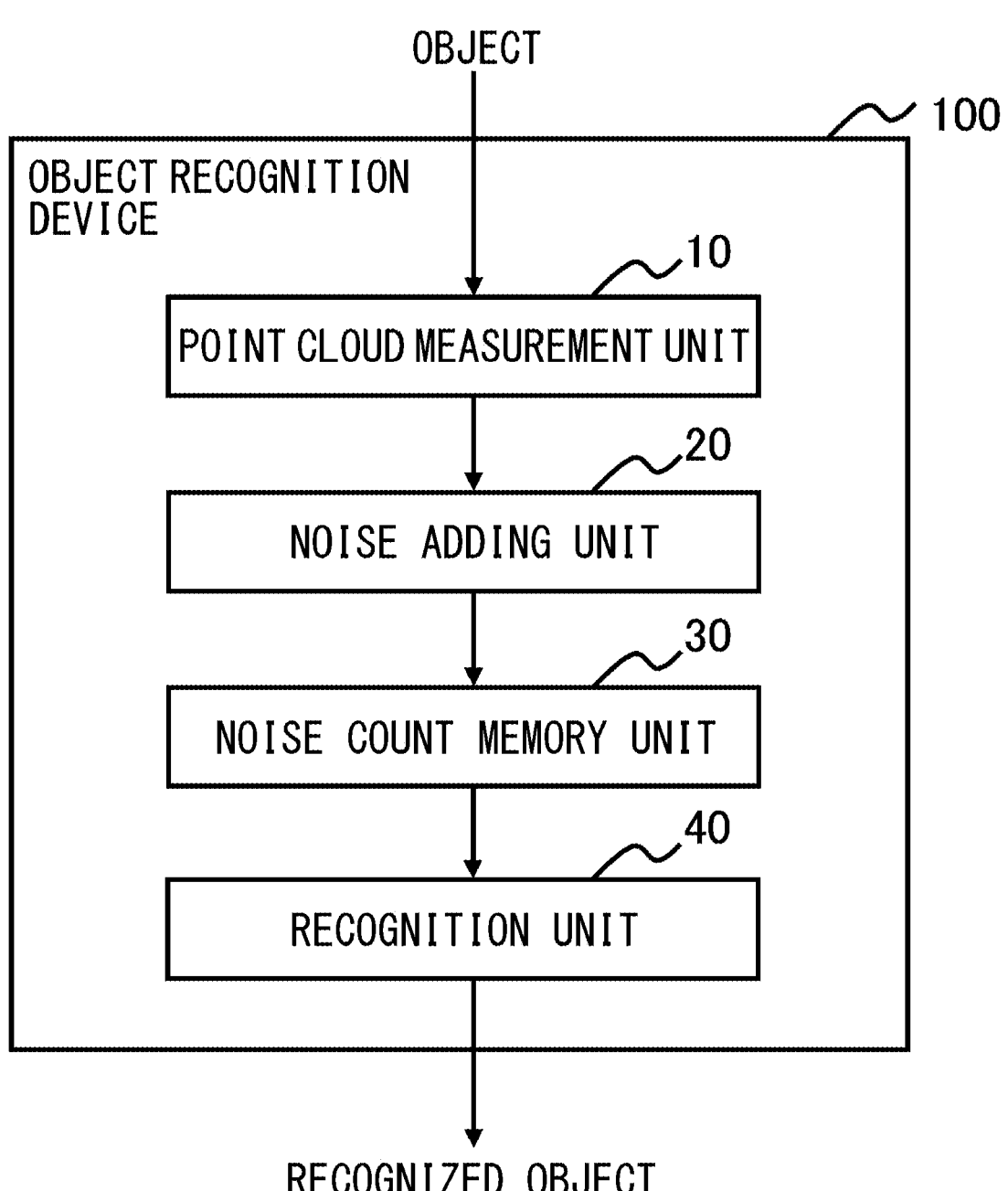
FIG. 1 is a functional block diagram of an object recognition device according to the first embodiment.

Hereinafter, the present invention will be described based on preferred embodiments with reference to the drawings. The dimensions of components in the drawings are enlarged or reduced as appropriate to facilitate understanding. Some of the elements in each figure may be omitted if they are not important for explanation. Terms including ordinal numbers (first, second, etc.) are used to explain various constituting elements, but the terms are used merely for the purpose of distinguishing one constituting element from the other constituting elements and shall not limit the constituting elements.

First Embodiment

FIG. 1 is a functional block diagram of an object recognition device 100 according to the first embodiment. The object recognition device 100 includes a point cloud measurement unit 10, a noise adding unit 20, a noise count memory unit 30, and a recognition unit 40.

The point cloud measurement unit 10 measures the position of a point cloud of one or more distance measurement points and the distance to the point cloud included on the surface of an object to be recognized (referred to as "object" in the present specification). The object recognition device 100 may be configured including LiDAR, for example. LiDAR measures the position of a point cloud by irradiating and scanning an object with a laser beam and receiving the reflected light from the object. Based on the time required from the irradiation to the reception of the light, LiDAR can measure the distance from the point cloud measurement unit 10 to the point cloud. The position and distance of each point included in the point cloud are acquired as a two-dimensional array where, given that the scanning range of LiDAR is represented by an XY plane, the position of each point is represented by coordinates on the XY plane and the distance of each point is represented by a coordinate value.

The point cloud whose distance is measured by a distance measurement device such as LiDAR may not be able to fully reflect the feature value of an object due to the number of such points being insufficient or other reasons. In such a case, the measured point cloud may be regarded as a noise rather than a feature value in object recognition. By adding a noise around such a point cloud, a stochastic resonance phenomenon can be expressed, and the feature value of the object can be emphasized.

The noise adding unit 20 adds a noise around a point cloud measured by the point cloud measurement unit 10 according to the distance to the point cloud. Since the scanning range of a laser beam extends radially in the irradiation direction, the interval between emitted laser beams increases as the distance from the light source increases. For this reason, the farther the object, the fewer the points that are irradiated with a laser beam through scanning and that allows for the reception of reflected light. As a result, the number of points included in the point cloud output from LiDAR becomes smaller. Therefore, it is considered that, when a noise is added around each point group, the number of added noises preferably increases as the distance to the point cloud decreases and preferably decreases as the distance to the point cloud increases. Furthermore, it is considered that the standard deviation (spatial spread of the added noise), which indicates the variation in the distribution range of the added noise, preferably increases as the distance to the point cloud decreases and decreases as the distance to the point cloud increases.

The noise added by the noise adding unit 20 is based on the distance from the point cloud measurement unit 10 to each point. For example, for noise, the position of each point is first obtained as coordinates on the XY plane, and then the distance of the point is obtained as a coordinate value. In this case, the value of the noise added to each point is the value indicating the distance of the point. A specific noise value may be, for example, a binary value indicating the presence or absence of each point in a point cloud. Alternatively, a noise value may be a value based on the distance to each point, for example, the distance to each point, the distance to each point multiplied by a predetermined coefficient, a value with a certain variation based on the distance to each point, or the like. Furthermore, a random value can be also given as a noise value.

Figure 2A:
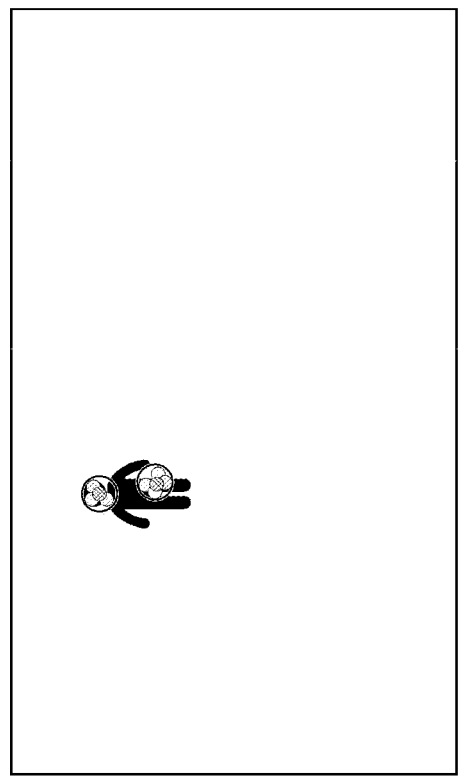
FIG. 2A shows point clouds of an object that is relatively close.
Figure 2B:
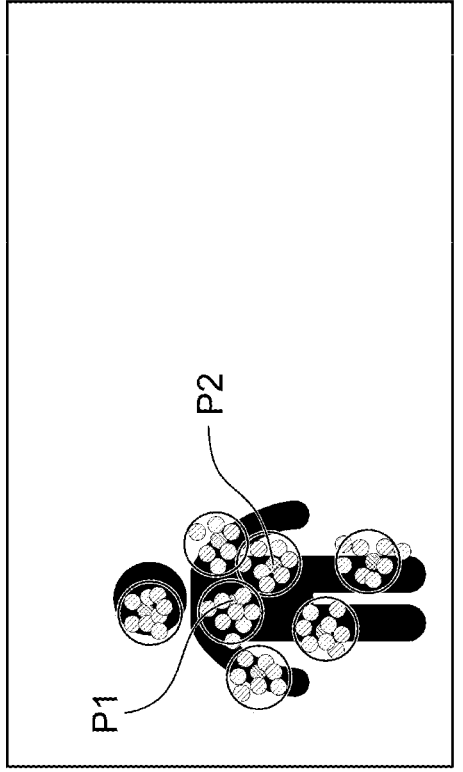
FIG. 2B shows point clouds of the object that is relatively far away.

FIG. 2 show examples of noises added by the noise adding unit 20 around point clouds measured by the point cloud measurement unit 10. FIG. 2A shows point clouds of an object that is relatively close, and FIG. 2B shows point clouds of the object that is relatively far away. Seven point clouds are observed in FIG. 2A, and two point clouds are observed in FIG. 2B. It can be found that more noises are added in a wider range around the point clouds in FIG. 2A than in FIG. 2B. Two points in the seven point clouds in FIG. 2A are labeled as P1 and P2. In FIGS. 2, points indicated by meshes represent point clouds of the object, and points indicated by slanted lines represent noises. The points P1 and P2 are described below.

Figure 3:
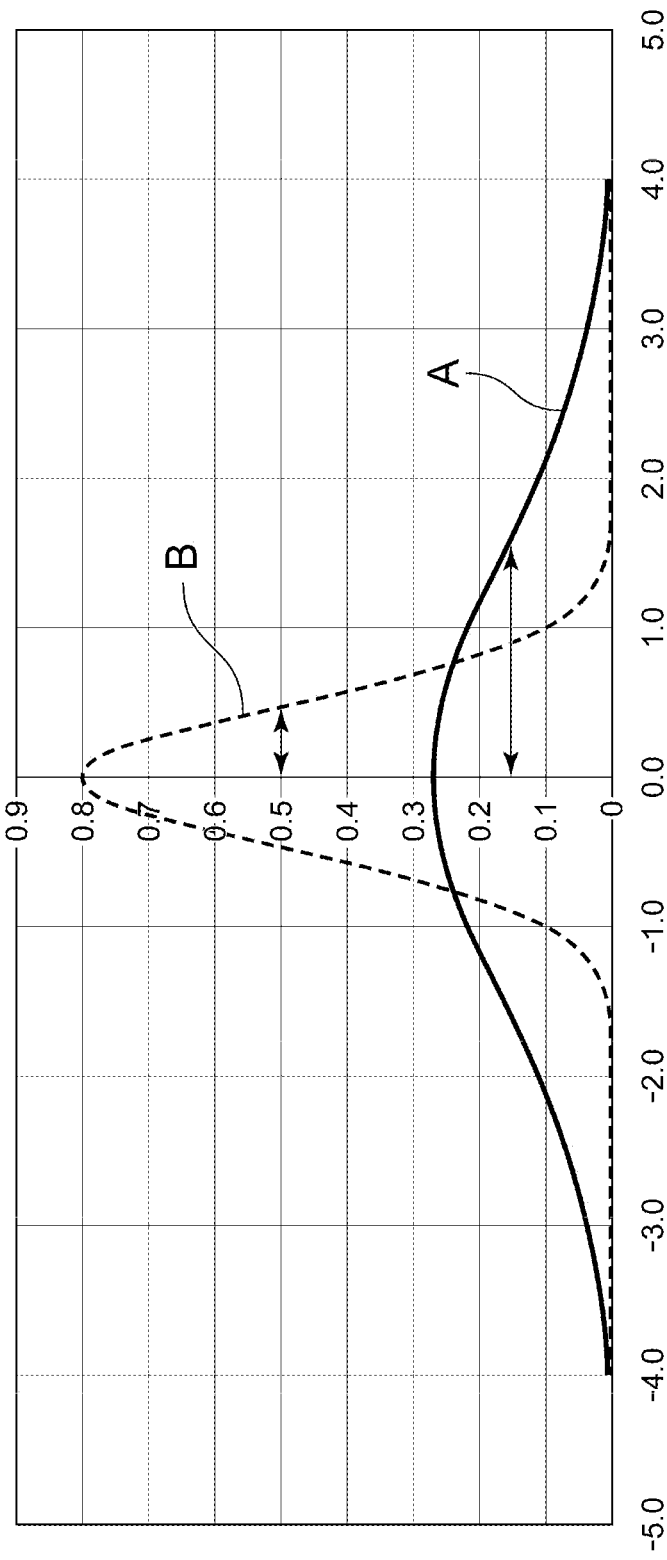
FIG. 3 is a diagram showing the distribution ranges of the noises added in FIG. 2A and FIG. 2B.

FIG. 3 shows the distribution ranges of the noises added in FIG. 2A and FIG. 2B. Solid lines represent the noise distribution in FIG. 2A, and dashed lines represent the noise distribution in FIG. 2B. The horizontal axis of the graph indicates the noise distribution range, and the vertical axis indicates the distribution density. Compared to FIG. 2B, the distribution range of the added noises is wider and the distribution density is lower in FIG. 2A. Therefore, it can be found that the standard deviation, which indicates the variation in the distribution range, is larger in FIG. 2A.

The noise count memory unit 30 stores the number of noises added by the noise adding unit 20 for each position of the added noises.

Figure 4:
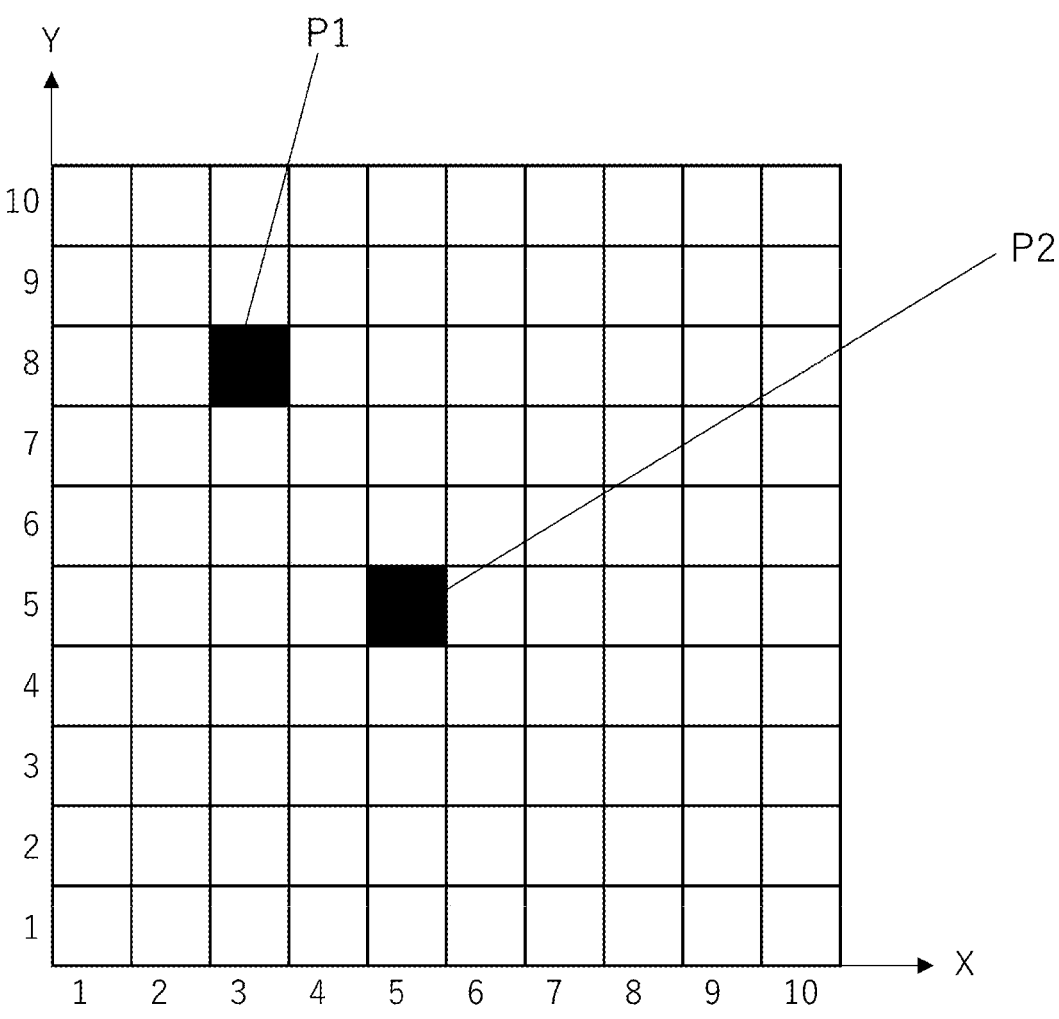
FIG. 4 is a diagram displaying points P1 and P2 in FIG. 2A on an XY plane.

FIG. 4 displays the points P1 and P2 in FIG. 2A on an XY plane. The coordinates of the points P1 and P2 are (3,8) and (5,5), respectively.

Figure 5:
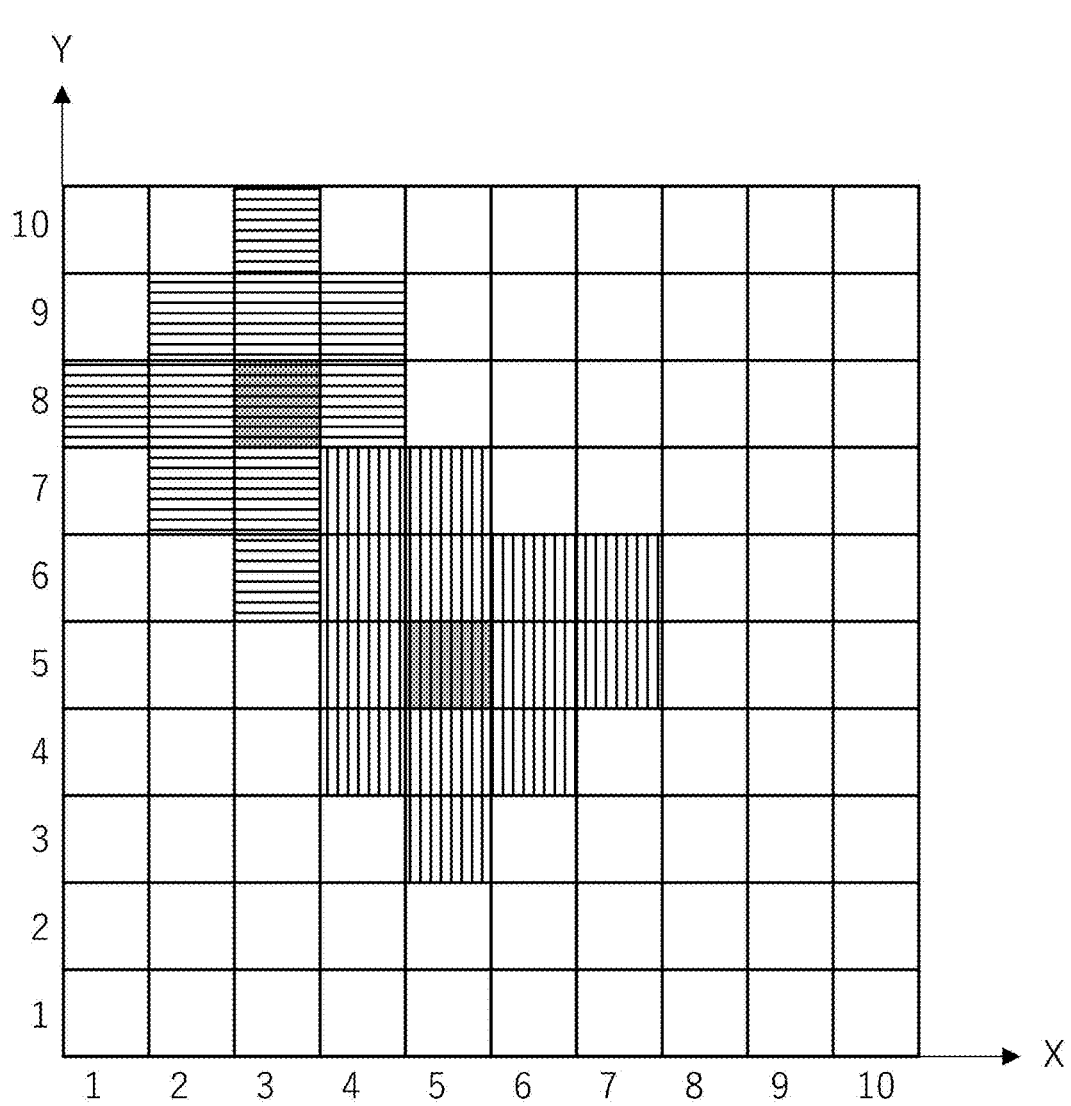
FIG. 5 is a diagram showing noises added around the points P1 and P2.

FIG. 5 shows noises added around the points P1 and P2. The positions of noises added around the point P1 is indicated by horizontal stripes, and the positions of noises added around the point P2 is indicated by vertical stripes. More specifically, the noises added around the point P1 are located at (1,8), (2,7), (2,8), (2,9), (3,6), (3,7), (3,8), (3,9), (3,10), (4,8), and (4,9), respectively. The noises added around the point P2 are located at (4,4), (4,5), (4,6), (4,7), (5,3), (5,4), (5,5), (5,6), (5,7), (6,4), (6,5), (6,6), (7,5), and (7,6), respectively.

Note that in FIG. 5, there are some pieces of already added noise data overwritten by noises added later. More specifically, in FIG. 5, data of noises added around the point P1 is first recorded, and the data of noises added around the point P2 is then recorded. To (4,7), a noise around the point P1 was first added. A noise around the point P2 was then added to (4,7). Therefore, the noise data around the point P1 recorded at (4,7) was overwritten by the noise data around point P2 and lost. As a result, only the noise added around the point P2 is recorded at (4,7). This means that some of the feature values regarding the point P1 have been lost. Further, when a noise is added around a given point, a noise may be added to the same coordinates multiple times. In other words, noise data at coordinates to which a noise has already been added may be overwritten by the same noise data.

Figure 6:
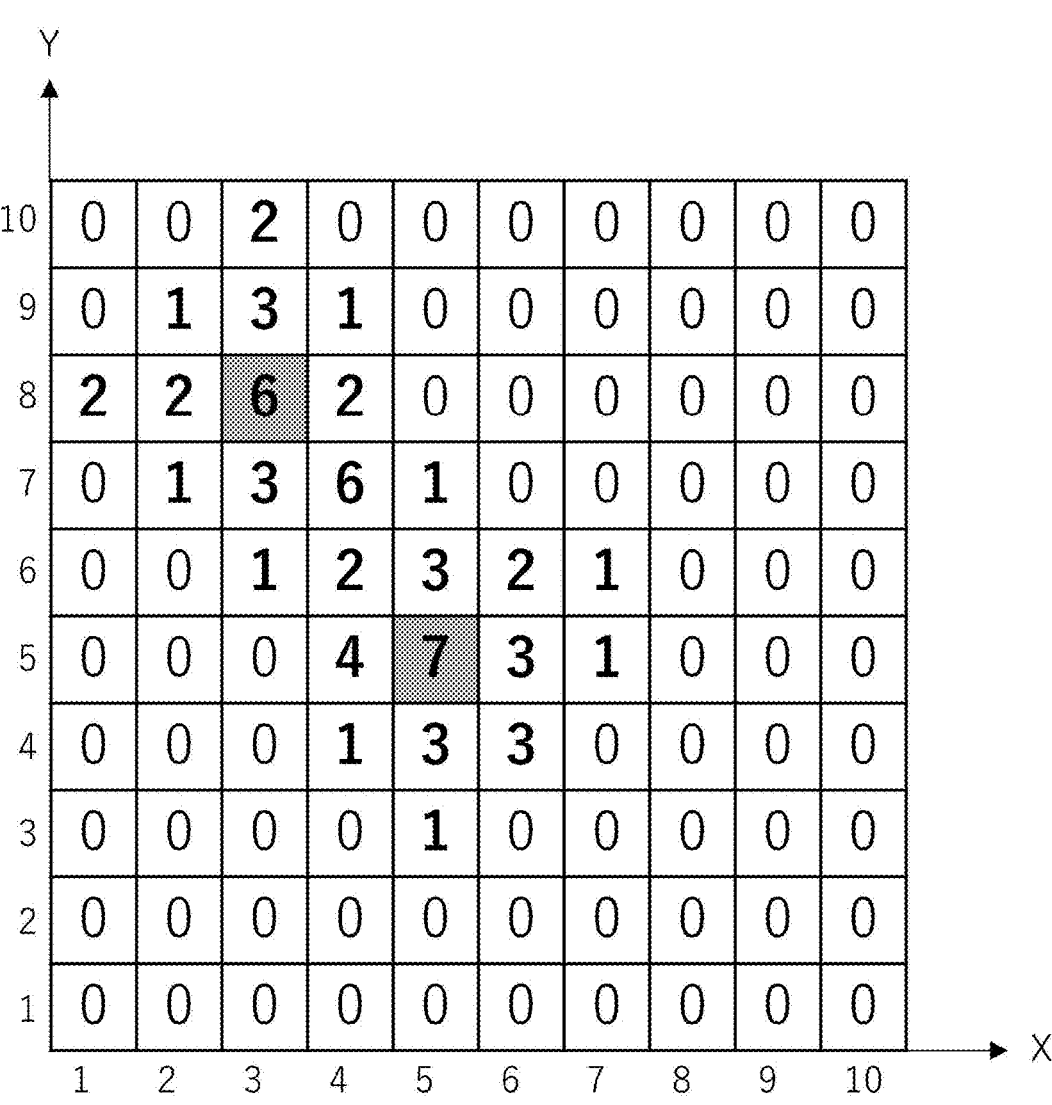
FIG. 6 is a diagram showing the number of noises for each noise position stored in a noise count memory unit.

FIG. 6 shows the number of noises for each noise position stored in the noise count memory unit 30. More specifically, there are two noises added to (1,8), one noise added to (2,7), two noises to (2,8), one noise added to (2,9), one noise added to (3,6), three noises added to (3,7), six noises added to (3,8), three noises added to (3,9), two noises added to (3,10), one noise added to (4,4), four noises added to (4,5), two noises added to (4,6), six noises added to (4,7), two noises added to (4,8), one noise added to (4,9), one added to (5,3), three noises added to (5,4), seven noises added to (5,5), three noises added to (5,6), one noise added to (5,7), three noises added to (6,4), three noises added to (6,5), two noises added to (6,6), one noise added to (7,5), and one noise added to (7,6).

Storing the number of noises added to each position in this way allows all information on the added noises to be kept without the overwriting of noise data. In other words, the feature values added to the object are not lost.

A large number of noises added at a certain position indicates that the position is important as a feature value of the object. In particular, in this example, the number of noises at (4,7) is six, which is higher than the surrounding positions. This is because noises were added for both the points P1 and P2. At the same time, it can be found that (4,7) is an important position connecting the point P1 and the point P2.

Note that the number of noises added at each position is irrespective of whether the number of noises results from noises added around either the P1 or the point P2. For this number of added noises at each position (the distribution of values shown in FIG. 6), a similar pattern continues when the measurement is repeated. This allows for the determination of whether the noises reflect the feature values of the object or are simply undesired noises.

The value of a noise added by the noise adding unit 20 may be an arbitrary value such as a binary value indicating the presence or absence of each point in a point cloud. Alternatively, the value may be a value based on the coordinate values of the point. In the present embodiment, the coordinate values of each point is the distance from the point cloud measurement unit 10 to the point, and the value of the noise added to each point is given according to the distance to the point such that the value increases as the distance increases and decreases as the distance decreases. For example, the value may be the distance to each point, the distance to each point multiplied by a predetermined coefficient, a value with a certain variation based on the distance to each point, or the like. Furthermore, a random value can be also given as a noise value.

The recognition unit 40 recognizes the object based on the point cloud and the noise added to the point cloud.

In the above example, noises are added in the same distribution to the points P1 and P2 included in the same point cloud. The distribution of the noise added to each point in the same point cloud is a distribution according to the distance from each point cloud. The distance from a point cloud in this case is a representative value of the distance of each point included in the point cloud. The representative value may be calculated based on the distance to each point. For example, the representative value may be the mean, median, maximum, or minimum value of the distance to each point. Alternatively, representative coordinates may be obtained from the coordinates of each point included in the point cloud, and the distance to the representative coordinates may be used as the distance from the point cloud. The representative coordinates mean, for example, the center of gravity of each point. Without limiting thereto, a noise may be added in a distribution according to the distance from each point. That is, for the points P1 and P2, noises may be added in different distributions according to the distance from each point.

As explained above, according to the present embodiment, a noise according to the distance to each point cloud can be added around the point cloud of an object without losing the feature value added to the object. This allows for highly accurate object recognition.

Second Embodiment

In one embodiment, the noise count memory unit 30 stores the number of noises added around each point in a measured point cloud for each point.

Figure 7B:
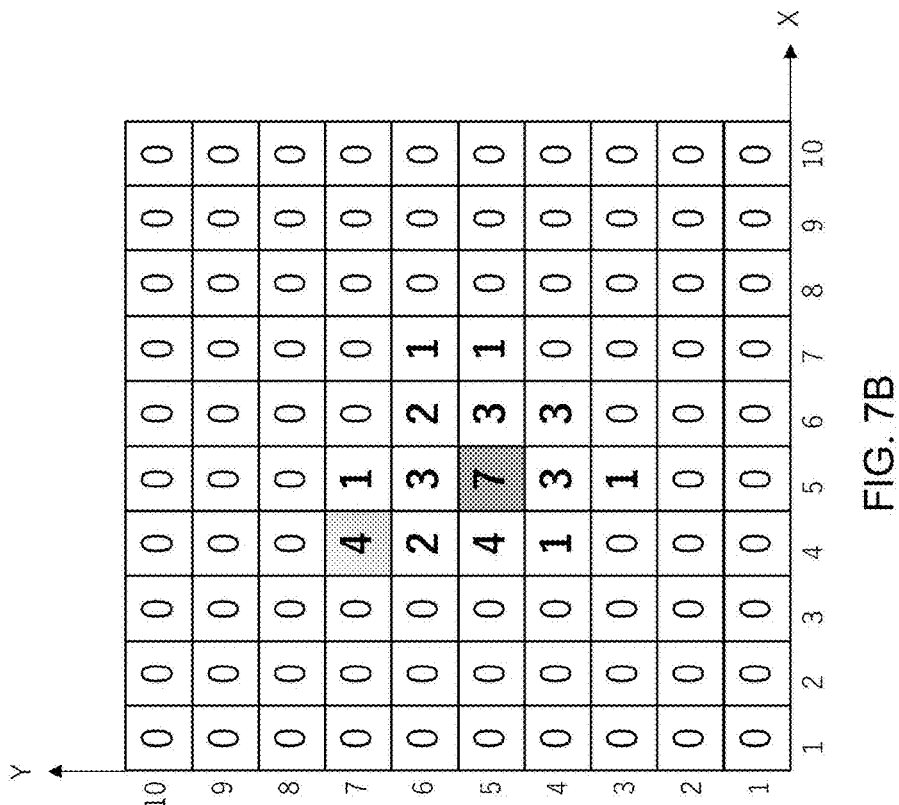
FIG. 7B shows the number of noises added around the point P2.
Figure 7A:
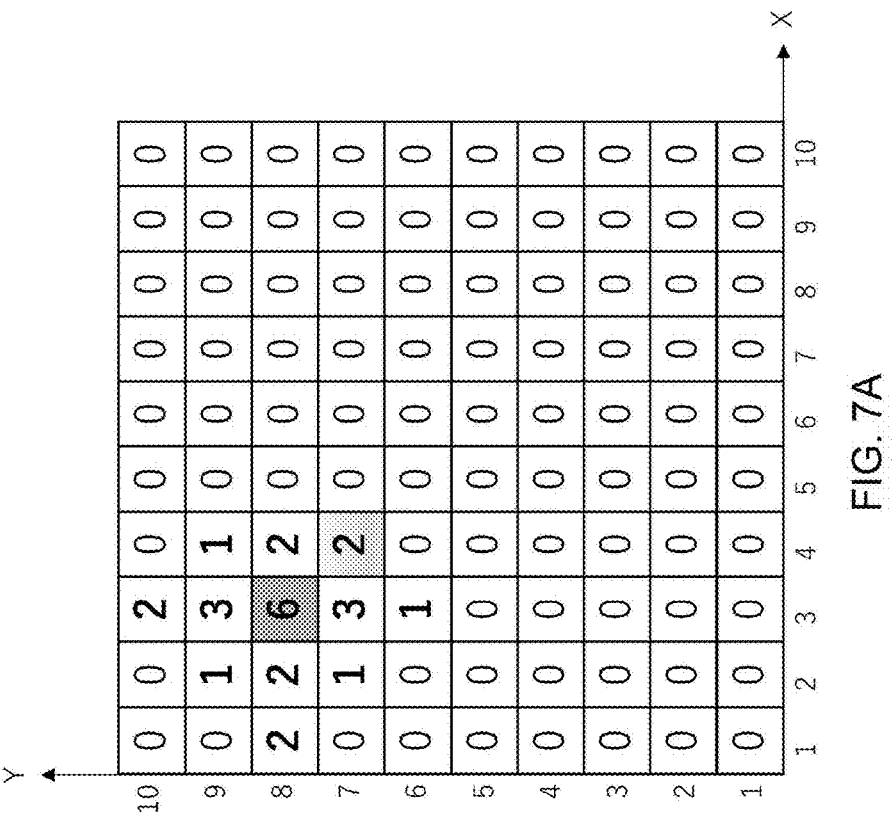
FIG. 7A shows the number of noises added around the point P1.

FIG. 7 show the number of noises stored in the noise count memory unit 30. FIG. 7A shows the number of noises added around the point P1. FIG. 7B shows the number of noises added around the point P2. More specifically, regarding the number of noises added around the point P1, there are two noises at (1,8), one noise at (2,7), two noises at (2,8), one noise at (2,9), one noise at (3,6), three noises at (3,7), six noises at (3,8), three noises at (3,9), two noises at (3,10), two noises at (4,7), two noises at (4,8) and one noise at (4,9). Regarding the number of noises added around the point P2, there are one noise at (4,4), four noises at (4,5), two noises at (4,6), four noises at (4,7), one noise at (5,3), three noises at (5,4), seven noises at (5,5), three noises at (5,6), one noise at (5,7), three noises at (6,4), three noises at (6,5), two noises at (6,6), one noise at (7,5), and one noise at (7,6).

According to the present embodiment, since the number of noises added around each point in a measured point cloud is stored for each point, it is possible to know around which point an added noise has been added. This allows for even more accurate object recognition.

Third Embodiment

In one embodiment, in addition to measuring the positions of point clouds included in an object and the distance to each of the point clouds, the point cloud measurement unit 10 further measures the luminance of point clouds included in the object. For the luminance, a luminance sensor may be provided so as to acquire the luminance in a range where the distance is acquired by LiDAR. Alternatively, the luminance may be calculated from information on the reflection intensity of the object acquired by LiDAR. The luminance is acquired as a two-dimensional array where the position of each point is represented by coordinates on an XY plane and the luminance of each point is represented by a coordinate value.

As in the same way as in the first embodiment, the noise adding unit 20 adds a noise based on the luminance of each point. More specifically, in a distribution according to the distance to each point cloud, the noise adding unit 20 adds a noise having a value based on the luminance of each point around a point cloud whose luminance has been acquired. The value of the noise is given such that the value increases as the luminance increases and decreases as the luminance decreases. For example, the value may be the luminance of each point, the luminance of each point multiplied by a predetermined coefficient, a value with a certain variation based on the luminance of each point, or the like. The noise count memory unit 30 stores the number of added noises for each position of the added noises.

According to the present embodiment, a noise can be added without losing the feature value added to an object also for the luminance of the object as well as the distance of the object. This allows for more accurate object recognition.

Fourth Embodiment

In one embodiment, in addition to measuring the positions of point clouds included in an object and the distance to each of the point clouds, the point cloud measurement unit 10 further measures the color of point clouds included in the object. For color information, an image sensor may be provided so as to acquire the color information in a range where the distance is acquired by LiDAR. Alternatively, the color information may be acquired by LiDAR, which emits multiple laser beams of different wavelengths. Alternatively, the color information may be calculated from information on the reflection intensity of the object acquired by LiDAR. The color information is acquired as a two-dimensional array of components (R component, G component, B component) where the position of each point is represented by coordinates on an XY plane and the pixel value of each color component (e.g., RGB) of each point is represented by a coordinate value. For example, if the color components are acquired as RGB values, the values are acquired as three two-dimensional arrays of the R component, the G component, and the B component.

As in the same way as in the first embodiment, the noise adding unit 20 adds noise based on the value of each color component (e.g., RGB) of each point. More specifically, in a distribution according to the distance to each point cloud, the noise adding unit 20 adds a noise having a value based on the color information of each point around a point cloud whose color information has been acquired. The value of the noise is given such that the value increases as the pixel value of each of the RGB components increases and decreases as the pixel value decreases. For example, the value may be the pixel value of each point, the pixel value of each point multiplied by a predetermined coefficient, a value with a certain variation based on the pixel value of each point, or the like. The noise count memory unit 30 stores the number of added noises for each position of the added noises.

According to the present embodiment, a noise can be added without losing the feature value added to an object also for the color of the object as well as the distance of the object. This allows for more accurate object recognition.

The above explanation explains that the point cloud measurement unit 10 includes LiDAR. However, without limiting thereto, the point cloud measurement unit 10 may be any unit that can measure the positions of point clouds included in the object and the distance to each of the point clouds.

The various processes of an object recognition device explained above can be realized as a device using hardware such as a CPU and memory. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be transmitted to and/or received from a server via a wired or wireless network. Still alternatively, the programs may be transmitted and/or received in the form of data transmission over terrestrial or satellite digital broadcast systems.

Fifth Embodiment

Figure 8:
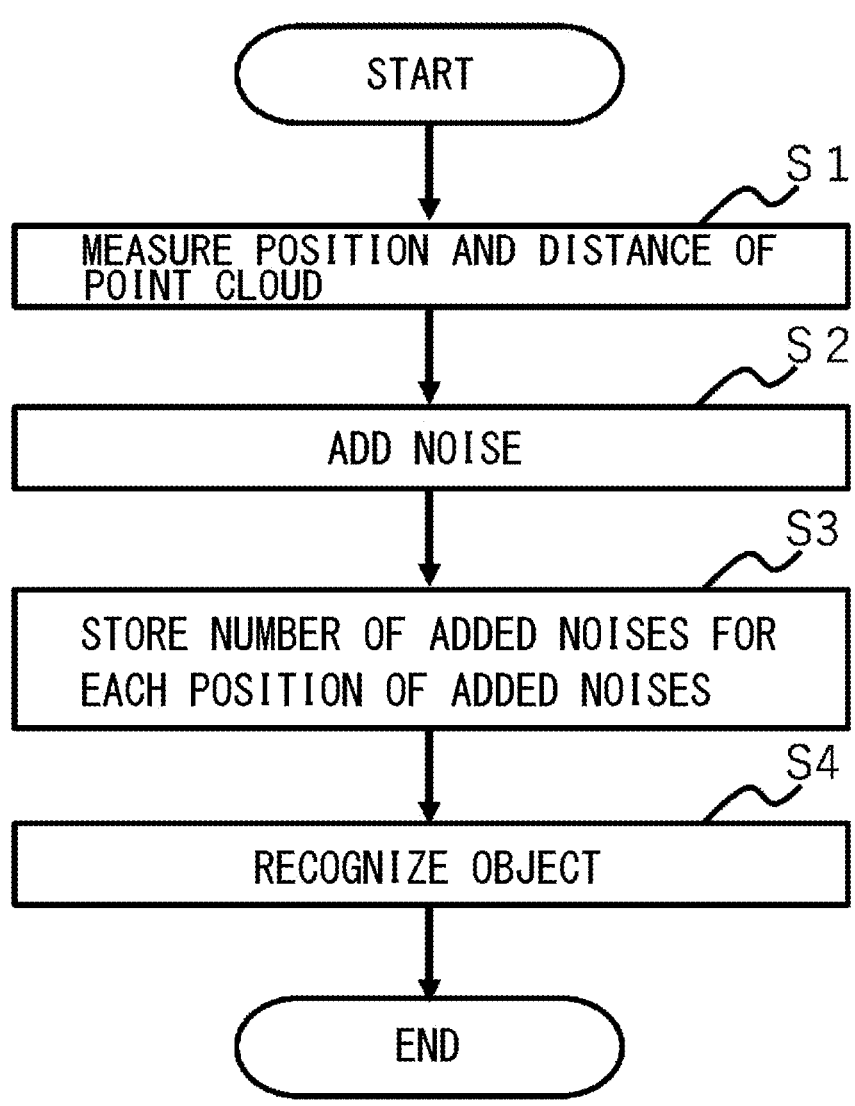
FIG. 8 is a flowchart explaining a processing procedure in an object recognition method according to the fifth embodiment.

FIG. 8 is a flowchart explaining a processing procedure in an object recognition method according to the fifth embodiment.

First, the present method uses a point cloud measurement unit so as to measure the positions of point clouds included in an object and the distance to each of the point clouds (S1).

Next, the present method uses a noise adding unit so as to add a noise around the measured point clouds according to the distance to each of the point clouds (S2).

Then, the present method uses a noise count memory unit so as to store the number of added noises for each position of the added noises (S3).

The present method then uses a recognition unit so as to recognize the object based on a point cloud and the noise added to the point cloud (S4).

According to the present embodiment, a noise according to the distance to each point cloud can be added around the point cloud of an object without losing a feature value added to the object.

Sixth Embodiment

The sixth embodiment relates to a computer program. This program includes computer-implemented modules including: a point cloud measurement module that measures the positions of point clouds included in an object and the distance to each of the point clouds; a noise adding module that adds a noise around the measured point clouds according to the distance to each of the point clouds; a noise count memory module that stores the number of added noises for each position of the added noises; and a recognition module that recognizes the object based on the point clouds and the noises added to the point clouds.

According to the present embodiment, it is possible to implement as software a program for adding a noise according to the distance to each point cloud around a point cloud of an object without losing a feature value added to the object.

FIGS. 4-7 show the distribution of point clouds at coordinates of 10×10. However, without limiting thereto, the point clouds that are acquired may be distributed in any range.

The above embodiments explain a case where one object is recognized. However, without limiting thereto, in one embodiment, a distance image in a predetermined range may be acquired so as to recognize multiple objects existing at different distances.

The above embodiments explain a case where a noise is added around each point in a point cloud. However, without limiting thereto, a noise may be added to the periphery of a point cloud.

Described above is an explanation given of the present invention based on the embodiments. The embodiments are intended to be illustrative only, and it will be obvious to those skilled in the art that various modifications to constituting elements and processes could be developed and that such modifications are also within the scope of the present invention.

What is claimed is:

1. An object recognition device for recognizing an object, comprising:
 a point cloud measurement unit configured to measure the positions of point clouds included in the object and the distance to each of the point clouds;
 a noise adding unit configured to add a noise around the measured point clouds according to the distance to each of the point clouds;
 a noise count memory unit configured to store the number of noises added by the noise adding unit for each position of the added noises; and
 a recognition unit configured to recognize the object based on the point clouds and the noises added to the point clouds.

2. The object recognition device according to claim 1, wherein the number of noises added around the measured point clouds increases as the distance to each of the cloud groups decreases.

3. The object recognition device according to claim 1, wherein the variation in the distribution range of noises added around the measured point clouds increases as the distance to each of the cloud groups decreases.

4. The object recognition device according to claim 1, wherein the noise count memory unit is configured to store the number of noises added by the noise adding unit for each point of the point clouds measured by the point cloud measurement unit, and the number of noises for each position of the added noises is stored for each point in the point clouds.

5. The object recognition device according to claim 1, wherein the point cloud measurement unit is configured to further measure the luminance of point clouds included in the target, and the noise adding unit is configured to add a noise around the measured point clouds according to the distance to and luminance of each of the point clouds.

6. The object recognition device according to claim 1, wherein the point cloud measurement unit is configured to further measure the color of point clouds included in the target, and the noise adding unit is configured to add a noise around the measured point clouds according to the distance to and color of each of the point clouds.

7. An object recognition method for recognizing an object, comprising:

measuring the positions of point clouds included in the object and the distance to each of the point clouds;

adding a noise around the measured point clouds according to the distance to each of the point clouds;

storing the number and position of added noises; and recognizing the object based on the point clouds and the noises added to the point clouds.

8. A non-transitory program recording medium comprising an object recognition program for recognizing an object, comprising computer-implemented modules including:

a point cloud measurement module that measures the positions of point clouds included in the object and the distance to each of the point clouds;

a noise adding module that adds a noise around the measured point clouds according to the distance to each of the point clouds;

a noise count memory module that stores the number and position of added noises; and a recognition module that recognizes the object based on the point clouds and the noises added to the point clouds.

\* \* \* \* \*